United States Patent
Welker

(10) Patent No.: US 7,957,218 B2
(45) Date of Patent: Jun. 7, 2011

(54) MEMORY CONTROLLER WITH SKEW CONTROL AND METHOD

(75) Inventor: James A. Welker, Leander, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 175 days.

(21) Appl. No.: 12/482,509

(22) Filed: Jun. 11, 2009

(65) Prior Publication Data

US 2010/0315891 A1    Dec. 16, 2010

(51) Int. Cl.
*G11C 8/00* (2006.01)

(52) U.S. Cl. ................................. 365/233.13; 365/193

(58) Field of Classification Search ............. 365/233.13, 365/193
See application file for complete search history.

(56) References Cited

U.S. PATENT DOCUMENTS

| | | |
|---|---|---|
| 6,975,556 B2 | 12/2005 | Schoenfeld et al. |
| 7,164,742 B2 | 1/2007 | McLeod |
| 7,441,139 B2 | 10/2008 | Kuwata |
| 7,460,418 B2 * | 12/2008 | Jung et al. ............... 365/194 |

* cited by examiner

*Primary Examiner* — Son Dinh
*Assistant Examiner* — Nam T Nguyen
(74) *Attorney, Agent, or Firm* — James L. Clingan, Jr.; Daniel D. Hill

(57) ABSTRACT

A dual data rate (DDR) memory controller and method are provided. The method includes: receiving a first data strobe at a first terminal from a first memory having a first rank; receiving a first data signal at a second terminal from the first memory having the first rank; calibrating the first data signal with the first data strobe to produce a first calibration value; receiving a second data strobe at the first terminal from a second memory having a second rank; receiving a second data signal at the second terminal from the second memory having the second rank; calibrating the second data signal with the second data strobe to produce a second calibration value; determining a final calibration value using the first and second calibration values; and using the final calibration value to time the first data signal and the second data signal during a read operation of the memories.

20 Claims, 3 Drawing Sheets

US 7,957,218 B2

MEMORY CONTROLLER WITH SKEW CONTROL AND METHOD

BACKGROUND

1. Field

This application relates generally to memory controllers, and more particularly, to memory controllers with skew control.

2. Related Art

Memory controllers are an important component in processing systems because memories are generally intentionally made to have relatively simple operating characteristics. This reduces the costs of the memories and avoids having to commit the memories to particular applications or to operating according to a particular processing scheme. Thus, the memory controllers provide much of necessary control for bringing data into a particular platform in a manner that is efficient both in terms of speed and utility for that platform. Speeds continue to increase, and it is not uncommon for the data to be received in 72 bits at a time. For example, an in-line memory module may have 9 different memories operating in parallel at 8 bits (one byte) each, whereas each byte of data is typically captured with a data strobe signal (which may be single-ended or differential) driven by the memory during reads. As a consequence, skew is an important issue because all 72 bits being accessed simultaneously and each byte of data must be captured with its corresponding data strobe signal. With that many different bits, it is difficult, if not impossible, for all of the data to arrive at the same time. Thus, one technique has been to provide a delay for each data bit and/or data strobe that is selectable based on experiments to test what delay is desirable to offset the skew. This method can be referred to as deskew. Although this type of deskew requires significant space on the memory controller, it has been found to be effective for the case where there is a single source for each bit, or where a single source may be trained and applied to other sources (i.e., other DIMM modules). Demand for more memory in many situations, has resulted in memory configurations in which a single bit received by the memory controller is selectively provided by more than one memory. For example, a dual in-line memory module (DIMM) may have ranks of memories in which one or the other rank provides the bits. This can be extended to four ranks or even more. This results in a different skew with respect to the data strobe for the same bit depending on which memory it came from. This skew differential has been tolerable, but with speeds increasing, an amount of skew differential that was passable in the past may not be now.

Thus there is a need for skew control that overcomes or improves upon one or more of the issues raised above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a system has a memory controller which accesses a memory having multiple ranks. Thus for a given access, a particular rank, which may be considered as a set of chip selectable memories, is chosen to provide the data which can be quite long. For example, a data access may be for 72 bits all provided simultaneously but with some skew between the bits and their associated data strobe. For each bit including for each rank, a test is performed to determine the optimum delay to deskew the bit. Thus, for a given bit, each rank is tested to determine the optimum delay. For the case of four ranks, a given bit is tested when it comes from each rank. The delay actually chosen is based on an average of the optimum delays. This average may be calculated in more than one way. One way is simply to average the four. Another is identify the highest and lowest and average those two. The result achieves a more optimum delay for the bit while providing minimal increase in required circuitry. This is better understood by reference to the following description and the drawings.

Figure 1:
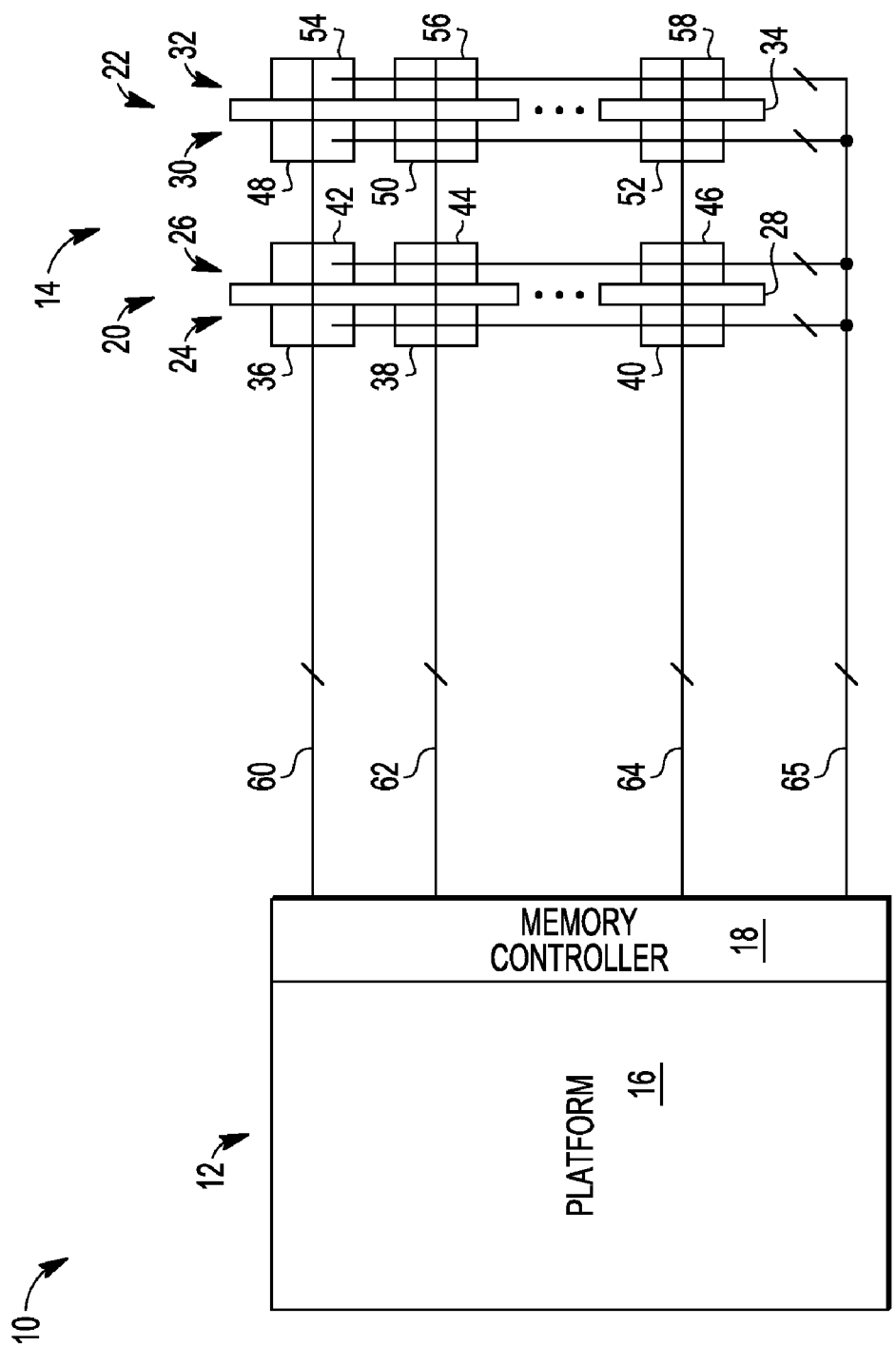
FIG. 1 is a combination block diagram and pictorial of a system according to an embodiment.

Shown in FIG. 1 is a system 10 comprising a processor 12 and a main memory 14. Processor 12 comprises a platform 16 and a memory controller 18. Main memory 14 comprises a dual in-line memory (DIMM) 20 and a DIMM 22. DIMM 20 comprises a substrate 28, a rank 24, and a rank 26. DIMM 22 comprises a substrate 34, a rank 30, and a rank 32. Rank 24 comprises 9 memory devices including a memory device 36, a memory device 38, and a memory device 40. Rank 26 comprises 9 memory devices including a memory device 42, a memory device 44, and a memory device 46. Rank 30 comprises 9 memory devices including a memory device 48, a memory device 50, and a memory device 52. Rank 32 comprises 9 memory devices including a memory device 54, a memory device 56, and a memory device 58. In this example, each memory device is a separate integrated circuit. Also included in system 10 are buses 60, 62, 64, and 65. Memory controller 18 is coupled to memory devices 36, 42, 48, and 54 by bus 60. Memory controller 18 is coupled to memory devices 36, 42, 48, and 54 by bus 60. Memory controller 18 is coupled to memory devices 38, 44, 50, and 56 by bus 62. Memory controller 18 is coupled to memory devices 40, 46, 52, and 58 by bus 64. In addition bus 65 couples memories 36, 38, 40, 42, 44, 46, 48, 50, 52, 54, 56, and 58 to memory controller 18. In operation, platform 16 is designed to perform functions using memory 14 and possibly other memory not shown such as a hard disk. Memory controller 18 ensures that the data transfers between platform 16 and memory 14 are performed efficiently which includes considerations of speed and reliability. Included in that is providing a delay for each data bit received to deskew the signals carrying data on buses 60, 62, and 64. The delay chosen is based on an average taking into account data that may be received from any of ranks 24, 26, 30, and 32.

Figure 2:
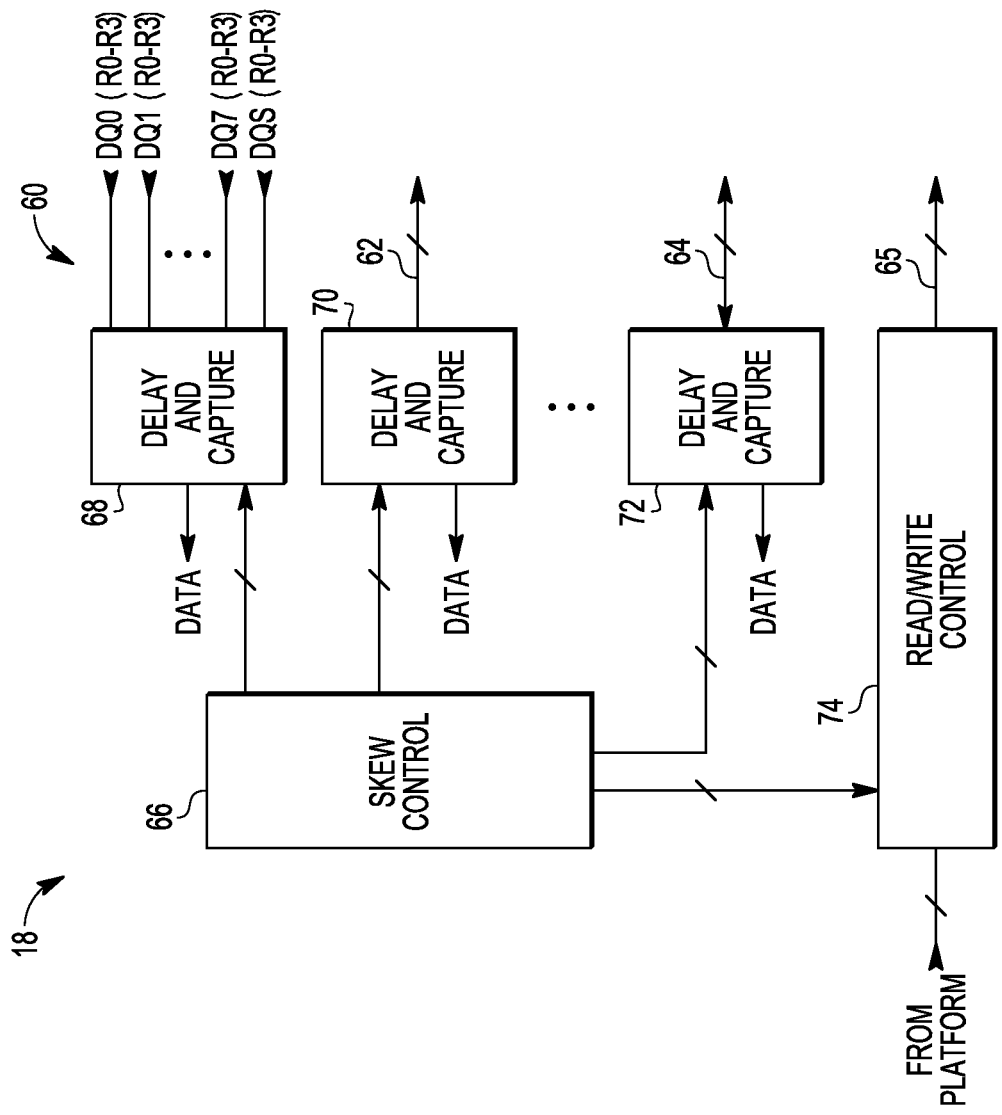
FIG. 2 is a block diagram of a portion of the system of FIG. 1.

Shown in FIG. 2 is memory controller 18 comprising a skew control 66, a delay and capture 68, delay and capture 70, a delay and capture 72, and a read/write control 74. Also shown are buses 60, 62, 64, and 65. As shown bus 60 comprises lines for data signals DQ and data strobe signal DQS from memories 36, 42, 48, and 54. Three different data lines DQ0, DQ1, and DQ7 are shown as well as data strobe signal DQS. These data lines can carry a data signal from any of ranks 24, 26, 30, and 32 shown in FIG. 2 as ranks R0, R1, R2, and R3, respectively. Delay and capture 68 provides delay for deskewing, and capture for providing the data to platform 16. Skew control 66 performs analysis of the data from memory 14 and selects the delay that is an average of ranks R0, R1, R2, and R3. The average can be determined in more than one way depending upon what is considered optimum as well as space efficient or other considerations. The average may be of all four. Another possibility is to determine what is midway between the highest and the lowest. Read/write control 74 is responsive to platform 16 for accessing memory 14 which includes addressing and control of memory 14.

Figure 3:
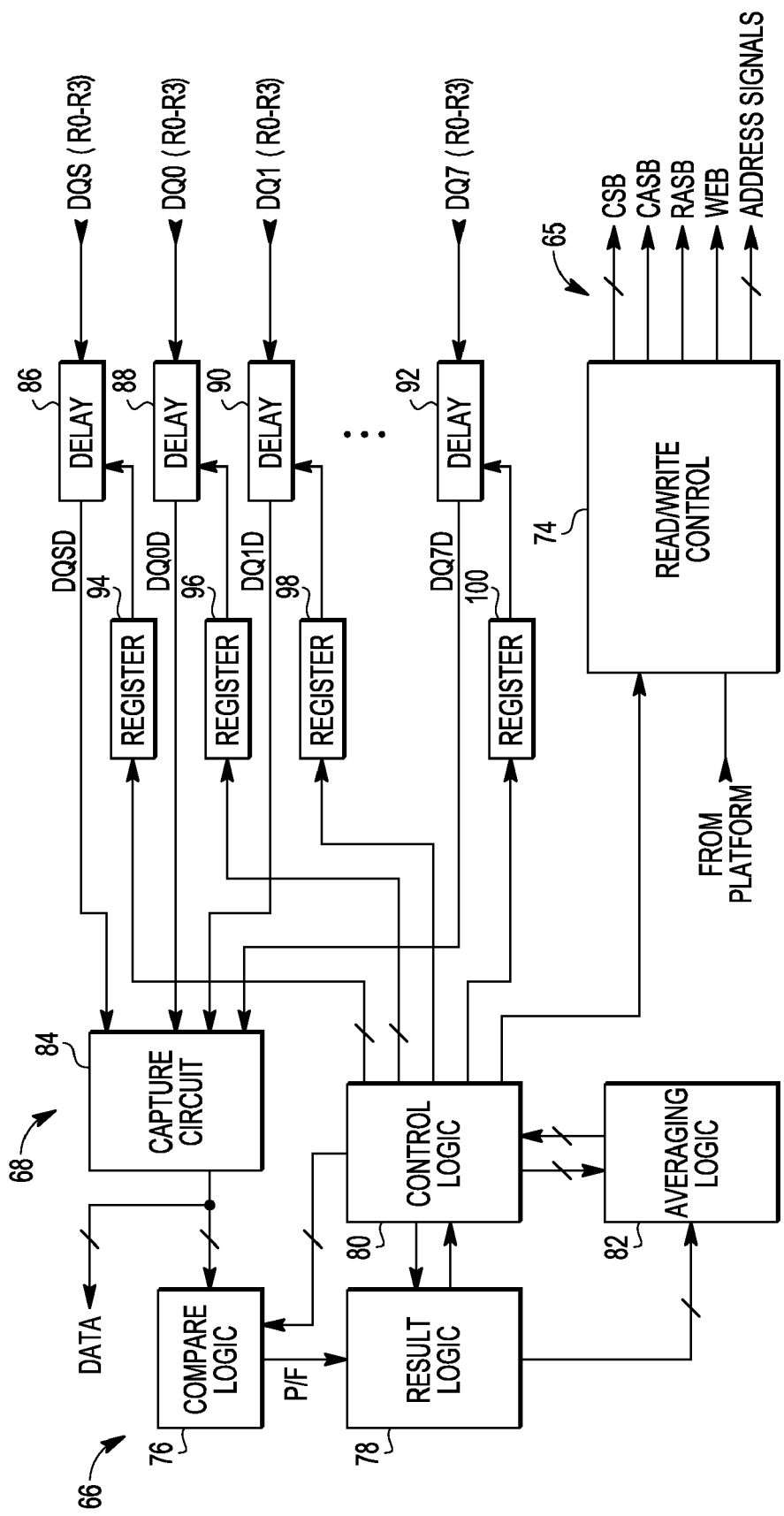
FIG. 3 is a block diagram of a portion of the portion shown in FIG. 2 of the system shown in FIG. 1.

Shown in FIG. 3 is delay and capture 68, skew control 66, and read/write control 74 in more detail. As shown in FIG. 3, skew control 66 comprises compare logic 76, result logic 78, control logic 80, and averaging logic 82. Delay and capture 68 comprises capture circuit 84, delay 86, delay 88, delay 90, delay 92, register 94 coupled to delay 86, register 96 coupled to delay 88, register 98 coupled to delay 90, and register 100 coupled to delay 92. Delay and capture 68 includes five additional delay/register pairs for DQ2, DQ3, DQ4, DQ5, and DQ6 not shown. Control logic 80 is coupled to compare logic 76, result logic 78, averaging logic 82, registers 94, 96, 98, and 100, and read/write control 74. Delays 86, 88, 90, and 92 are coupled to capture circuit 84. Compare logic 76 is coupled to capture circuit 84 and result logic 78. Result logic 78 is coupled to averaging logic 82. As shown, coupled to read/write control 74 is bus 65 comprising chip select signals CSB (B designates as being active at a logic low), signal CASB, signal RASB, write enable WEB, and the address signals. Delays 86, 88, 90, and 92 are adjustable.

Registers 94, 96, 98, and 100 indicate to the delay to which they are coupled the delay that is to be provided. To establish the desired delay for delay, the skew must be first determined for DQ0 for each of the four ranks, R0, R1, R2, and R3. First for testing DQ0 for rank R0, which is memory 36 in this example, register 96 is loaded by control logic 80 to a midpoint of the delay range of delay 88. In this example, delay 88 has 32 increments of delay which can be set by the value of register 96 being set from 0 to 31. Thus, 15 is chosen for register 96 as the midpoint of delay 88. Signal DQS is a clock which is also delay in regular operation. For beginning testing, register 94 is set to 0 so that delay 86 is at its minimum delay. For the first test signal DQ0 is obtained in response to read/write control 74 initiating a read of a known data stream from rank R0. Delay 88 receives DQ0, delays it by the setting of register 96 which is 15, provides delayed data signal DQ0D signal to capture circuit 84 where it is stored. Delay 86 provides delayed clock signal DQSD to capture circuit 84. Capture circuit 84 stores delayed data signal DQ0D as clocked by delayed clock signal DQSD. Compare logic 76 compares delayed signal DQ0D to the known data stream. If it is the same it is a pass and if it is not it is a fail. Result logic 78 stores the pass/fail information for each test. Normally the first test will be a fail. The tests continue by incrementing register 94. Thus the second test is with register 94 being loaded with 1. Control logic 80 directs read/write control 74 to execute the read again. Delay 88 receives DQ0 and delays according to the stored value of 15 in register 96 and generates delayed data signal DQ0D where it is clocked into capture circuit 84 by delayed clock signal DQSD which has been delayed by 1 as determined by register 94. Compare logic determines if it is the same as the known data stream and generates a pass or a fail to result logic 78. The process continues by continuing to increment register 94 and initiating reads to generate signal DQ0 from rank R0. As the process continues, eventually several passes in a row will occur followed by series of fails. A pass can be generated by jitter so that it is possible to have a pass followed by a failure or several failures followed by a series of passes. To be sure that it is not jitter that is causing a pass, the tests continue for a predetermined number of samples, for example 10, after the last pass. Control logic 80, using information present in result logic 78, determines when testing can stop. In this case of signal DQ0 from rank R0, there should be several passes. The value that is considered the best is the midpoint of the passes. Thus, for values of register 94 of pass such as 20, 21, 22, 23, and 24, the optimum value is considered to be 22. Result logic 78 provides the optimum value, 22 in this example, to averaging logic 82.

For signal DQ0 from rank 1, which is memory 42, the tests are run the same as for signal DQ0 from rank R0. Register 94 begins at 0 and is incremented by one for each additional test while register 96 is maintained at 15. The results are recorded in result logic 78 and the optimum value is sent to averaging logic 82. This process continues with the DQ0 signals from any additional enabled ranks, such as ranks 2 and 3 in this example, which are memories 48 and 54 for the case of signal DQ0. After signal DQ0 has been tested for all of the ranks, ranks R0-R3 in this example, averaging logic 82 has the resulting optimum value from result logic 78 for the four sources, which are ranks R0-R3. The process continues for all data signals of delay and capture 68 and then proceeds to each data signal of the other delay and capture circuits such as delay and capture 70 and delay and capture 72. The result is averages of the optimum values for each data bit present in the system. These values are used to provide deskewing for memory controller 18.

An effective way to implement this deskewing is to choose a reference value for register 94 that is convenient for offsetting delays in the registers such as registers 96, 98, and 100. One such way is simply to choose the first optimum value which in this example is 22 and load that into register 94, which is the register that sets the clock delay. Thus, for operation, register 94 is set to 22 as the reference value. Register 96 is set by adding to or subtracting from the test setting that it had, which was 15. The amount added or subtracted from the test setting is based on how much the average varies from the reference value. Thus, for example, if the average value was 24 for DQ0, then the difference between the reference value and the average value is 2. Because the value of delay that is being averaged is the delay of the clock relative to the data signal, an average delay in excess of the reference results in a subtraction from the test delay. In this case, register 96 is decremented by 2 so 13 is stored in register 96 by control logic 80. Similarly, the average of the optimum values for the other DQ signals such as DQ1 and DQ7 are compared to the reference value and accordingly the difference is added to or subtracted from 15 for the values stored in registers 98 and 100, respectively. For example, if the average value for DQ1 is 20, then the difference from the reference is minus 2 so that 2 is then added to 15 so that control logic stores 17 in register 98.

The particular type of averaging, which is used to calibrate the registers that set the delay and which is performed by averaging logic 82, may vary. One way is to simply take an average. Another is taking the average between the highest and lowest values. In any event, there is obtained a measure of the optimum delay for each rank for each DQ signal and each of those optimum delays is taken into account in determining the delay chosen for that DQ signal. One way an optimum delay is taken into account is to include it in an average. Another way is determine that the particular optimum delay is the high or the low delay for all of the ranks. Yet another way that an optimum delay is taken into account is to determine that it is between the high and low delay.

By now it should be appreciated that there has been provided a method of operating a dual data rate memory controller. The method includes receiving a first data strobe at a first terminal from a first memory having a first rank. The method includes receiving a first data signal at a second terminal from the first memory having the first rank. The method includes calibrating the first data signal with the first data strobe to produce a first calibration value. The method includes receiving a second data strobe at the first terminal from a second memory having a second rank. The method includes receiving a second data signal at the second terminal from the second memory having the second rank. The method includes calibrating the second data signal with the second data strobe to produce a second calibration value. The method includes determining a final calibration value using the first and second calibration values. The method includes using the final calibration value to time the first data signal and the second data signal during a read operation of the first and second memories. The method may have a characterization by which determining the final calibration value further comprises determining the final calibration value by determining an average calibration value using the first and second calibration values. The method may further include receiving a third data strobe at the first terminal from a third memory having a third rank, receiving a third data signal at the second terminal from the third memory, calibrating the third data signal with the third data strobe to produce a third calibration value, and determining the final calibration value by determining an average calibration value using the first, second, and third calibration values. The method may have a characterization by which calibrating the first data signal further comprises adjusting an adjustable delay to cause a first edge of the first data signal to be received at a predetermined cycle of the first data strobe. The method may have a characterization by which The method of claim 4, wherein the predetermined cycle is during a first half cycle of the first data strobe. The method may have a characterization by which the first and second calibration values further comprise tap numbers of a delay chain having a plurality of delay elements. The method may further comprise storing logic states of the first and second data signals in a storage element. The method may have a characterization by which the storage element comprises a first-in, first-out (FIFO) memory.

Described also is a method of operating a dual data rate memory controller. The method includes receiving a first data strobe at a first terminal from a first memory having a first rank. The method further includes receiving a first data signal at a second terminal from the first memory having the first rank. The method further includes adjusting a delay time of the first data signal relative to the first data strobe to produce a first calibration value. The method further includes receiving a second data strobe at the first terminal from a second memory having a second rank. The method further includes receiving a second data signal at the second terminal from the second memory having the second rank. The method further includes adjusting a delay time of the second data signal relative to the second data strobe to produce a second calibration value. The method further includes determining a final calibration value by determining an average delay time using the first and second calibration values. The method further includes using the final calibration value to time the first data signal and the second data signal during a read operation of the first and second memories. The method may have a further characterization by which adjusting the delay time of the first data signal relative to the first data strobe further comprises providing an adjustable delay chain in a data path of the first data signal, the adjustable delay chain having a plurality of selectable taps, wherein adjusting the delay time comprises selecting one of the plurality of selectable taps. The method may have a further characterization by which adjusting the delay time of the first data signal relative to the first data strobe further comprises providing an adjustable delay chain in a data path of the first data strobe, the adjustable delay chain having a plurality of selectable taps, wherein adjusting the delay time comprises selecting one of the plurality of selectable taps. The method may have a further characterization by which determining the final calibration value by determining the average delay time using the first and second calibration values further comprises determining the final calibration value by determining an average tap number of a delay chain having a plurality of taps. The method may further comprise storing logic states of the first and second data signals in a storage element. The method may have a further characterization by which the storage element comprises a first-in, first-out (FIFO) memory.

Also described is a dual data rate memory controller. The memory controller includes a first adjustable delay chain having an input terminal for coupling to a plurality of memories, wherein each memory of the plurality of memories belongs to a predetermined rank, the first adjustable delay chain for receiving a data signal representative of data stored in a selected one of the plurality of memories, and an output terminal for providing a delayed data signal. The memory controller further includes a second adjustable delay chain having an input terminal for coupling to the plurality of memories for receiving a data strobe from the selected one of the plurality of memories, and an output terminal for providing a delayed data strobe. The memory controller further includes a control circuit coupled to control terminals of the first and second adjustable delay chains for controlling a relative delay of the delayed data signal relative to the delayed data strobe for each rank of the plurality of memories. The memory controller further includes an averaging logic circuit for receiving the delayed data signal and the delayed data strobe for each rank of the plurality of memories, and in response, determining an average relative delay time, the average relative delay time being used during read accesses of the plurality of memories. The memory controller may have a further characterization by which the each of the first and second adjustable delay chains further comprises a plurality of taps, the plurality of taps for adjusting a delay time for each of the first and second adjustable delay chains. The memory controller may further comprise a storage element coupled to the output terminals of the first and second adjustable delay chains. The memory controller may have a further characterization by which the storage element comprises a first-in, first-out (FIFO) storage element. The memory controller may further comprise compare logic coupled to the output terminal of the first adjustable delay chain for testing read data from the plurality of memories. The memory controller may have a further characterization by which the DDR memory controller is implemented as part of a data processing system on an integrated circuit.

Although the invention is described herein with reference to specific embodiments, various modifications and changes can be made without departing from the scope of the present invention as set forth in the claims below. For example, a single line was drawn serially through the cores from the group controller, this may be achieved with multiple lines or different lines from the group controller. Also the exact deskew algorithm use for obtaining the delay value for each source of a data bit and its corresponding data strobe may be different than that described. The obtained delay values are used for the averaging, and the particular method for obtaining those values can vary. Additionally, two or more sources, such as memory devices, may be present for each data bit received by the memory controller. Further, the memory data bus width is not limited to the size used in the example above. In addition, the memory can be provided to the system in many different ways such as via DIMM modules or by soldering the discrete memory devices directly on a board. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a dual data rate (DDR) memory controller, a method comprising:
   receiving a first data strobe at a first terminal from a first memory having a first rank;
   receiving a first data signal at a second terminal from the first memory having the first rank;
   calibrating the first data signal with the first data strobe to produce a first calibration value;
   receiving a second data strobe at the first terminal from a second memory having a second rank;
   receiving a second data signal at the second terminal from the second memory having the second rank;
   calibrating the second data signal with the second data strobe to produce a second calibration value;
   determining a final calibration value using the first and second calibration values; and
   using the final calibration value to time the first data signal and the second data signal during a read operation of the first and second memories.

2. The method of claim 1, wherein determining the final calibration value further comprises determining the final calibration value by determining an average calibration value using the first and second calibration values.

3. The method of claim 1, further comprising;
   receiving a third data strobe at the first terminal from a third memory having a third rank;
   receiving a third data signal at the second terminal from the third memory;
   calibrating the third data signal with the third data strobe to produce a third calibration value; and
   determining the final calibration value by determining an average calibration value using the first, second, and third calibration values.

4. The method of claim 1, wherein calibrating the first data signal further comprises adjusting an adjustable delay to cause a first edge of the first data signal to be received at a predetermined cycle of the first data strobe.

5. The method of claim 4, wherein the predetermined cycle is during a first half cycle of the first data strobe.

6. The method of claim 1, wherein the first and second calibration values further comprise tap numbers of a delay chain having a plurality of delay elements.

7. The method of claim 1, further comprising storing logic states of the first and second data signals in a storage element.

8. The method of claim 7, wherein the storage element comprises a first-in, first-out (FIFO) memory.

9. In a dual data rate (DDR) memory controller, a method comprising:
   receiving a first data strobe at a first terminal from a first memory having a first rank;
   receiving a first data signal at a second terminal from the first memory having the first rank;
   adjusting a delay time of the first data signal relative to the first data strobe to produce a first calibration value;
   receiving a second data strobe at the first terminal from a second memory having a second rank;
   receiving a second data signal at the second terminal from the second memory having the second rank;
   adjusting a delay time of the second data signal relative to the second data strobe to produce a second calibration value;
   determining a final calibration value by determining an average delay time using the first and second calibration values; and
   using the final calibration value to time the first data signal and the second data signal during a read operation of the first and second memories.

10. The method of claim 9, wherein adjusting the delay time of the first data signal relative to the first data strobe further comprises providing an adjustable delay chain in a data path of the first data signal, the adjustable delay chain having a plurality of selectable taps, wherein adjusting the delay time comprises selecting one of the plurality of selectable taps.

11. The method of claim 9, wherein adjusting the delay time of the first data signal relative to the first data strobe further comprises providing an adjustable delay chain in a data path of the first data strobe, the adjustable delay chain having a plurality of selectable taps, wherein adjusting the delay time comprises selecting one of the plurality of selectable taps.

12. The method of claim 9, wherein determining the final calibration value by determining the average delay time using the first and second calibration values further comprises determining the final calibration value by determining an average tap number of a delay chain having a plurality of taps.

13. The method of claim 9, further comprising storing logic states of the first and second data signals in a storage element.

14. The method of claim 13, wherein the storage element comprises a first-in, first-out (FIFO) memory.

15. A dual data rate (DDR) memory controller comprising:
   a first adjustable delay chain having an input terminal for coupling to a plurality of memories, wherein each memory of the plurality of memories belongs to a predetermined rank, the first adjustable delay chain for receiving a data signal representative of data stored in a selected one of the plurality of memories, and an output terminal for providing a delayed data signal;
   a second adjustable delay chain having an input terminal for coupling to the plurality of memories for receiving a data strobe from the selected one of the plurality of memories, and an output terminal for providing a delayed data strobe;
   a control circuit coupled to control terminals of the first and second adjustable delay chains for controlling a relative delay of the delayed data signal relative to the delayed data strobe for each rank of the plurality of memories; and
   an averaging logic circuit for receiving the delayed data signal and the delayed data strobe for each rank of the plurality of memories, and in response, determining an average relative delay time, the average relative delay time being used during read accesses of the plurality of memories.

16. The DDR memory controller of claim 15, wherein the each of the first and second adjustable delay chains further comprises a plurality of taps, the plurality of taps for adjusting a delay time for each of the first and second adjustable delay chains.

17. The DDR memory controller of claim 15, further comprising a storage element coupled to the output terminals of the first and second adjustable delay chains.

18. The DDR memory controller of claim 17, wherein the storage element comprises a first-in, first-out (FIFO) storage element.

19. The DDR memory controller of claim 18, further comprising compare logic coupled to the output terminal of the first adjustable delay chain for testing read data from the plurality of memories.

20. The DDR memory controller of claim 15, wherein the DDR memory controller is implemented as part of a data processing system on an integrated circuit.

* * * * *